United States Patent
Li et al.

(10) Patent No.: US 12,489,586 B2
(45) Date of Patent: Dec. 2, 2025

(54) METHODS AND DEVICES FOR CONFIGURING HARQ-ACK FEEDBACK

(71) Applicant: ZTE Corporation, Shenzhen (CN)

(72) Inventors: Xincai Li, Shenzhen (CN); Li Tian, Shenzhen (CN); Ling Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 561 days.

(21) Appl. No.: 17/969,074

(22) Filed: Oct. 19, 2022

(65) Prior Publication Data
US 2023/0043308 A1    Feb. 9, 2023

Related U.S. Application Data

(63) Continuation of application No. PCT/CN2020/091787, filed on May 22, 2020.

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC ............................ H04L 5/0055; H04L 1/1812
See application file for complete search history.

(56) References Cited

U.S. PATENT DOCUMENTS

| | | | |
|---|---|---|---|
| 11,831,446 | B2 | 11/2023 | Wang et al. |
| 2019/0045489 | A1 | 2/2019 | He et al. |
| 2019/0268803 | A1 | 8/2019 | He et al. |

FOREIGN PATENT DOCUMENTS

| | | |
|---|---|---|
| CN | 102223219 A | 10/2011 |
| CN | 107317656 A | 11/2017 |
| CN | 1105057697 A | 11/2019 |
| CN | 110557972 A | 12/2019 |
| CN | 110708146 A | 1/2020 |
| CN | 111034093 A | 4/2020 |
| CN | 111130735 A | 5/2020 |

(Continued)

OTHER PUBLICATIONS

R1-2002227 Nokia "Remaining issues on NR-U HARQ scheduling and feedback" 3GPP WG1 #100b e-Meeting Apr. 20-30, 2020 (Year: 2020).*

(Continued)

*Primary Examiner* — Basil Ma
(74) *Attorney, Agent, or Firm* — Crowell & Moring LLP

(57) ABSTRACT

The present disclosure describes methods, system, and devices for configuring hybrid automatic repeat request acknowledgement (HARQ-ACK) feedback for physical downlink shared channel (PDSCH) transmission. The method includes receiving, by a user equipment (UE), a radio resource control (RRC) parameter to configure a one-shot HARQ-ACK feedback mode; and receiving, by the UE, a first downlink control information (DCI) comprising a first K, the first DCI corresponding to a first PDSCH. The method includes receiving, by the UE, a second DCI comprising a second K with an applicable value and an one-shot request field with a positive value, the second DCI corresponding to a second PDSCH; and transmitting, by the UE, a one-shot HARQ-ACK feedback according to a preset rule.

16 Claims, 14 Drawing Sheets

(56) References Cited

FOREIGN PATENT DOCUMENTS

| KR | 10-2019-0097296 A | 8/2019 |
|---|---|---|
| WO | WO 2019/216620 A1 | 11/2019 |
| WO | WO 2020/001134 A1 | 1/2020 |
| WO | WO 2020033237 A1 | 2/2020 |
| WO | WO 2020/063641 A1 | 4/2020 |

OTHER PUBLICATIONS

Extended European Search Report regarding EP 20 89 6541 dated Mar. 23, 2023.
Chinese Office Action with English translation, Apr. 26, 2024, pp. 1-13, issued in Chinese Patent Application No. 202080101237.2.
Chinese Search Report with English translation, Sep. 26, 2024, pp. 1-6, issued in Chinese Application No. 2020801012438, State Intellectual Property Office.
Chinese Office Action with English translation, Oct. 8, 2024, pp. 1-21, issued in Chinese Application No. 202080101243.8, State Intellectual Property Office, Beijing, China.
Nokia, Nokia Shanghai Bell, Remaining issues on NR-U-HARQ scheduling and feedback, Feb. 24-28, 2020, pp. 1-12, 3GPP TSG RAN WG1 Meeting #100e, R1-2000503, e-Meeting.
Chinese Office Action with English translation, dated Sep. 11, 2024 issued in Chinese Patent Application No. 202080101237.2 (12 Pages).
International Search Report, dated Jan. 29, 2021, pp. 1-3, issued in International Patent Application No. PCT/CN2020/091780, National Intellectual Property Administration, PRC, Beijing, China.
Written Opinion of the International Searching Authority, dated Jan. 29, 2021, pp. 1-4, issued in International Patent Application No. PCT/CN2020/091780, National Intellectual Property Administration, PRC, Beijing, China.
Extended European Search Report, May 11, 2023, pp. 1-9, issued in European Patent Application No. 20897552.4, The Hague, The Netherlands.
CATT, Remaining details of NR CA operation, Feb. 26-Mar. 2, 2018, pp. 1-6, R1-1801740, Agenda Item: 7.1.3.4.2, 3GPP TSG RAN WG1 Meeting #92, Athens, Greece.
Lenovo, Motorola Mobility, Text proposals for HARQ enhancement for NR-U, Feb. 24-Mar. 6, 2020, pp. 1-9, R1-2000592, Agenda Item: 7.2.2.2.3, 3Gpp TSG RAN WG1 #100, E-meeting.
Sharp, HARQ enhancement for NR unlicensed operation, May 13-17, 2019, pp. 1-8, R1-1907214, Agenda Item: 7.2.2.2.3, 3GPP TSG RAN WG1 Meeting #97, Reno, Nevada, US.
International Search Report and Written Opinion regarding PCT/CN2020/091787 dated Feb. 7, 2021.
Ericsson. "HARQ Enhancement," RI-2003845, May 16, 2020.
Nokia et al. "Remaining issues on NR-U HARQ scheduling and feedback," RI-2002227, Apr. 10, 2020.
Chinese Office Action with English translation, dated Mar. 28, 2025, issued in Chinese Patent Application No. 202080101243.8 (15 Pages).

* cited by examiner

400

```
receiving, by a user equipment (UE), a radio resource control (RRC) parameter to
configure a one-shot HARQ-ACK feedback mode;
                                                                            410
```

```
receiving, by the UE, a first downlink control information (DCI) comprising a first K,
the first DCI corresponding to a first PDSCH;
                                                                            420
```

```
receiving, by the UE, a second DCI comprising a K with an applicable value and an
one-shot request field with a positive value, the second DCI corresponding to a
second PDSCH;
                                                                            430
```

```
transmitting, by the UE, a one-shot HARQ-ACK feedback according to a preset rule.
                                                                            440
```

FIG. 4

METHODS AND DEVICES FOR CONFIGURING HARQ-ACK FEEDBACK

CROSS-REFERENCE TO RELATED APPLICATION

This application is a continuation application of PCT International Patent Application No. PCT/CN2020/091787, filed with the China National Intellectual Property Administration, PRC on May 22, 2020, which is herein incorporated by reference in its entirety.

TECHNICAL FIELD

The present disclosure is directed generally to wireless communications. Particularly, the present disclosure relates to methods and devices for configuring hybrid automatic repeat request acknowledgement (HARQ-ACK) feedback.

BACKGROUND

Wireless communication technologies are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. Ultra-reliable low-latency communication (URLLC) may provide communication with a high reliability and low latency between a user equipment and wireless access network nodes. URLLC may be supported on a licensed frequency carrier and/or an unlicensed frequency carrier. There are some issues and problems associated with transmitting feedback information, for example, when a user equipment (UE) need to configure hybrid automatic repeat request acknowledgement (HARQ-ACK) feedback, how to improve the performance of transmitting feedback information. The present disclosure may address at least some of issues associated with the existing system to improve the performance of the wireless communication.

SUMMARY

This document relates to methods, systems, and devices for wireless communication, and more specifically, for configuring hybrid automatic repeat request acknowledgement (HARQ-ACK) feedback.

In one embodiment, the present disclosure describes a method for wireless communication. The method includes configuring hybrid automatic repeat request acknowledgement (HARQ-ACK) feedback for physical downlink shared channel (PDSCH) transmission by: receiving, by a user equipment (UE), a radio resource control (RRC) parameter to configure a one-shot HARQ-ACK feedback mode; receiving, by the UE, a first downlink control information (DCI) comprising a first K, the first DCI corresponding to a first PDSCH; receiving, by the UE, a second DCI comprising a second K with an applicable value and an one-shot request field with a positive value, the second DCI corresponding to a second PDSCH; and transmitting, by the UE, a one-shot HARQ-ACK feedback according to a preset rule.

In one embodiment, the present disclosure describes a method for wireless communication. The method includes configuring hybrid automatic repeat request acknowledgement (HARQ-ACK) feedback for physical downlink shared channel (PDSCH) transmission by: sending, by a radio access network (RAN) to a user equipment (UE), a radio resource control (RRC) parameter to configure a one-shot HARQ-ACK feedback mode; sending, by the RAN to the UE, a first downlink control information (DCI) comprising a first K, the first DCI corresponding to a first PDSCH; sending, by the RAN to the UE, a second DCI comprising a second K with an applicable value and an one-shot request field with a positive value, the second DCI corresponding to a second PDSCH; and receiving, by the RAN from the UE, a one-shot HARQ-ACK feedback according to a preset rule.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4 shows a flow diagram of a method for wireless communication.

DETAILED DESCRIPTION

Figure 1:
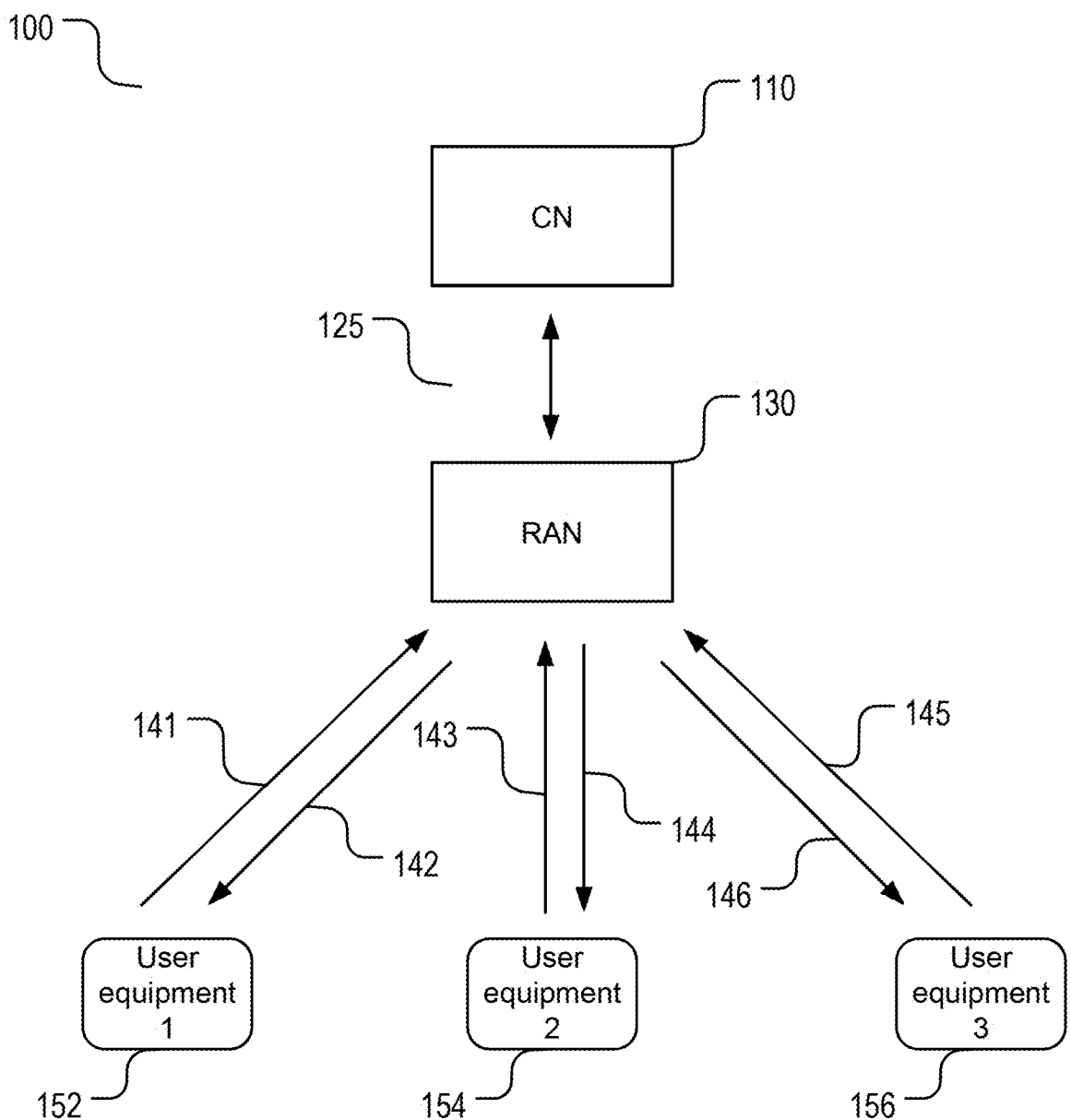
FIG. 1 shows an example of a wireless communication system.

The present disclosure will now be described in detail hereinafter with reference to the accompanied drawings, which form a part of the present disclosure, and which show, by way of illustration, specific examples of embodiments.

Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for configuring hybrid automatic repeat request acknowledgement (HARQ-ACK) feedback.

Next generation (NG), or 5th generation (5G), wireless communication may provide a range of capabilities from downloading with fast speeds to support real-time low-latency communication. New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. Ultra-reliable low-latency communication (URLLC) may provide communication with a high reliability and low latency between a user equipment and wireless access network nodes. To increase bandwidth, shorten latency, and/or improve speed, the wireless communication may be carried on licensed frequency bands and/or new radio unlicensed (NR-U) frequency bands.

In the 5th generation (5G) communication system on licensed frequency carriers, a URLLC service may configure one or more subslots within one slot. Each of the one or more subslots may be configured to transmit the feedback information, so as to lower the latency in the URLLC service on licensed carriers. In the 5th generation (5G) communication system on NR-U frequency carriers, problems exist so as to increase time needed for transmitting feedback information, thus increasing latency and worsening the performance of the communication system on NR-U frequency carriers.

The present disclosure describes various embodiments addressing some of the problems discussed above.

FIG. 1 shows a wireless communication system 100 including a core network (CN) 110, a radio access network (RAN) 130, and one or more user equipment (UE) (152, 154, and 156). The RAN 130 may include a wireless network base station, or a NG radio access network (NG-RAN) base station or node, which may include a nodeB (NB, e.g., a gNB) in a mobile telecommunications context. In one implementation, the core network 110 may include a 5G core network (5GC), and the interface 125 may include a new generation (NG) interface.

Referring to FIG. 1, a first UE 152 may wirelessly receive downlink communication 142 from the RAN 130 and wirelessly send uplink communication 141 to the RAN 130. Likewise, a second UE 154 may wirelessly receive downlink communication 144 from the RAN 130 and wirelessly send uplink communication 143 to the RAN 130; and a third UE 156 may wirelessly receive downlink communication 146 from the RAN 130 and wirelessly send uplink communication 145 to the RAN 130. For example but not limited to, a downlink communication may include a physical downlink shared channel (PDSCH) or a physical downlink control channel (PDCCH), and a uplink communication may include a physical uplink shared channel (PUSCH) or a physical uplink control channel (PUCCH). The downlink communication (142, 144, and/or 146) and/or uplink communication (141, 143, and/or 145) may be transmitted on licensed frequency carriers or NR-U frequency carriers.

When URLLC operates on licensed carriers, UE may be configured with more than one HARQ-ACK codebooks by at least one radio resource control (RRC) parameter, for example but not limited to, pdsch-HARQ-ACK-Codebook-List-r16 and UCI-OnPUSCH-List-r16. When two HARQ-ACK codebooks are configured, the parameters for these HARQ-ACK codebooks, such as candidate k1 set, the PUCCH resource set and UCI-OnPUSCH may be separately configured. The transmission of the two HARQ-ACK codebooks may be dependently in different PUCCH/PUSCH. When the transmission of these two codebooks occurs at the same slot, the HARQ-ACK codebook for lower priority (e.g., Priority index=0) may be dropped.

Using unlicensed carriers to transmit data may increase the utilization rate of available transmission resources, thus improving URLLC performance. There are some challenges associated with operating URLLC on unlicensed carriers. In low-latency wireless communications on the unlicensed carriers, a transmitted wireless message may be lost or corrupted and uncorrectable due to channel quality imperfection and fluctuation in the communication resources. As channel access should be performed before data transmission, for example, a device needs to perform a clear channel assessment (CCA) and have a successful result prior to data transmission. In some countries and regions, there are regulatory policies for the use of unlicensed spectrum. A device may perform a listening before talk procedure (e.g., CCA) before sending data via an unlicensed carrier. For example, according to a channel access procedure, only devices with successful CCA may send data on the unlicensed carrier.

Another problem may occur when URLLC operates in unlicensed carriers. When channel access failure occurs, the gNB/UE may not send data and the receiver may not receive the data correctly. These messages, which are not received correctly, may need to be retransmitted again, thus worsening the latency and reliability. Therefore, proper designs of control mechanisms for detection and retransmission of the lost or corrupted messages may help improve the efficiency of the wireless access network, particular for accessing unlicensed shared radio frequency bands. To improve efficiency of data transmission, channel access procedure and control signaling need to be considered, and a communication system may support fast and reliability data transmission such as using unlicensed carriers for transmitting URLLC uplink HARQ-ACK feedback.

For wireless transmission in unlicensed carriers, a one-shot HARQ-ACK feedback scheme may be used to provide multiple transmission opportunity for ACK/NACK feedback. When a UE configures one-shot feedback scheme and the one-shot request bit filed in a downlink control information (DCI) is 1, the UE may transmit a HARQ-ACK feedback codebook containing all DL HARQ processes (one-shot feedback) for all CCs configured for a UE in the PUCCH group in the PUCCH/PUSCH. For a DCI with a format 1_1, at least one RRC parameter for one-shot HARQ-ACK feedback includes pdsch-HARQ-ACK-OneShotFeedbackCBG-r16 and pdsch-HARQ-ACK-OneShotFeedbackNDI-r16 and is configured in the PhysicalCellGroupConfig IE, which may be UE-specific.

The present disclosure describes various embodiments for supporting URLLC transmission on unlicensed bands and carriers, and providing more transmission opportunity for HARQ-ACK feedback. The various embodiments include one-shot HARQ-ACK codebook mode supported for URLLC. The present disclosure addresses some challenges when URCCL supports one-shot HARQ-ACK codebook feedback for the unlicensed band operation, for example but not limited to, how to combine the two different characters of these two requirements, and/or how to implement the compatibility of NR-U HARQ design and URLLC enhancements.

Figure 2:
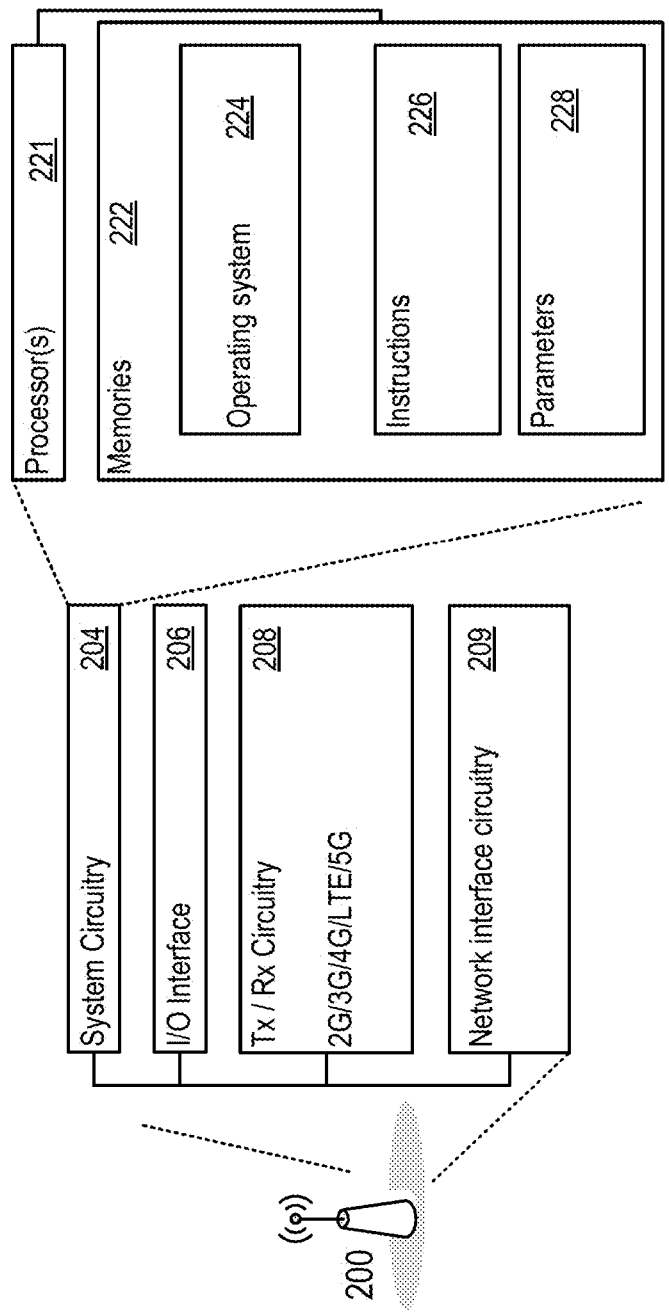
FIG. 2 shows an example of a wireless network node.

FIG. 2 shows an exemplary a radio access network or a wireless communication base station 200. The base station 200 may include radio transmitting/receiving (Tx/Rx) circuitry 208 to transmit/receive communication with one or more UEs, and/or one or more other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
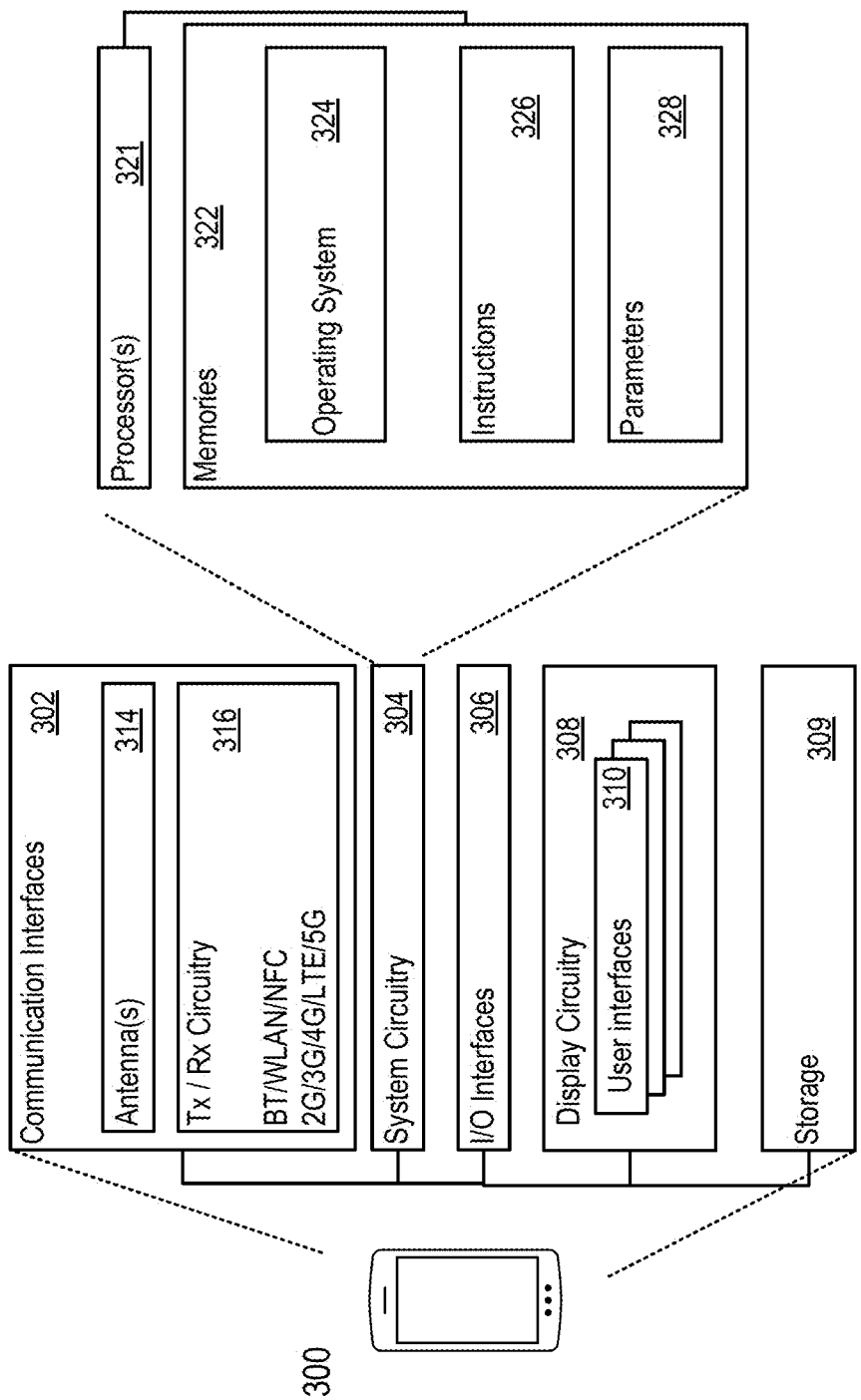
FIG. 3 shows an example of a user equipment.

FIG. 3 shows an exemplary user equipment (UE) 300. The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several embodiments of methods and devices for configuring hybrid automatic repeat request acknowledgement (HARQ-ACK) feedback for physical downlink shared channel (PDSCH) transmission, which may be implemented, partly or totally, on the wireless network base station and/or the user equipment described above in FIGS. 2 and 3.

In one embodiment, referring to FIG. 4, a method 400 for wireless communication includes configuring hybrid automatic repeat request acknowledgement (HARQ-ACK) feedback for physical downlink shared channel (PDSCH) transmission. The method 400 may include a portion or all of the following: step 410, receiving, by a user equipment (UE), a radio resource control (RRC) parameter to configure a one-shot HARQ-ACK feedback mode; step 420, receiving, by the UE, a first downlink control information (DCI) comprising a first K, the first DCI corresponding to a first PDSCH; step 430, receiving, by the UE, a second DCI comprising a second K with an applicable value and an one-shot request field with a positive value, the second DCI corresponding to a second PDSCH; and step 440, transmitting, by the UE, a one-shot HARQ-ACK feedback according to a preset rule.

Referring to step 410, a base station (e.g., RAN) transmits a RRC parameter to UE to configure the UE in a one-shot HARQ-ACK feedback mode. In one implementation, the RRC parameter may include pdsch-HARQ-ACK-Codebook with a positive value of pdsch-HARQ-ACK-OneShotFeedback-r16 to configure the UE in the one-shot HARQ-ACK feedback mode. The value of pdsch-HARQ-ACK-OneShotFeedback-r16 may be 1.

Referring to step 420, the UE receives a first DCI corresponding to a first PDSCH. The first DCI include a first K. K may be a PDSCH-to-HARQ_feedback timing indicator. In one implementation, the first K of the first DCI may have an applicable value. In another implementation, the first K may have a non-applicable value.

A K of a DCI may be known as a K1. When a K (or K1) is a non-negative value, the K (or K1) has a numerical value or an applicable value. The K (or K1) with an applicable value may indicate a scheduling timing between the PDSCH and the corresponding PUCCH so that the UE may transmit the HARQ-ACK information for the PDSCH in a slot in the PUCCH/PUSCH at the K after the corresponding PDSCH. For example, there may be K1 number of slots (or subslots) between the PUCCH and the PDSCH.

When a K (or K1) is a negative value, for example but not limited to, −1, the K (or K1) has a non-numerical value or a non-applicable value. The K (or K1) with a non-applicable value may indicate to a UE that the UE should store the HARQ-ACK feedback for this PDSCH.

Referring to step 430, the UE receives a second DCI corresponding to a second PDSCH. The second DCI include a second K with an applicable value and an one-shot request field with a positive value. In one implementation, the one-shot request field with a positive value include the one-shot request field with a value of 1.

Referring to step 440, according to a preset rule, the UE may transmit a one-shot HARQ-ACK feedback to the base station.

In one embodiment, the UE combines a first HARQ-ACK feedback for the first PDSCH in a one-shot HARQ-ACK codebook with a second HARQ-ACK feedback for the second PDSCH. The UE transmits the one-shot HARQ-ACK codebook in a slot at the second K after the second PDSCH. In one implementation, the first DCI and the second DCI may schedule PDSCH with a same priority index. In another implementation, the first DCI and the second DCI may schedule PDSCH with difficult priority indexes.

DCI may have several formats, for example but not limited to, DCI format 1_0, DCI format 1_1, and DCI format 1_2. The present disclosure may be applicable to at least one or all of the DCI formats.

In one implementation, for one-shot HARQ-ACK codebook, for different priority indicator, different RRC parameters for one-shot HARQ-ACK feedback may be configured. The RRC parameter may include pdsch-HARQ-ACK-OneShotFeedbackCBG-r16 and pdsch-HARQ-ACK-OneShotFeedbackNDI-r16, which may be different for different Priority indicator. For example, for Priority indicator=0, pdsch-HARQ-ACK-OneShotFeedbackCBG-r16 may be enabled or disabled; and for priority indicator=1, pdsch-HARQ-ACK-OneShotFeedbackCBG-r16 may be enabled or disabled. Similarly, for Priority indicator=0, pdsch-HARQ-ACK-OneShotFeedbackNDI-r16 may be enabled or disabled; and for priority indicator=1, pdsch-HARQ-ACK-OneShotFeedbackNDI-r16 may be enabled or disabled.

In another implementation, a bit field for one-shot HARQ-ACK request is added to the DCI format1_2. When the bit field for one-shot HARQ-ACK request is 1, one-shot HARQ-ACK feedback is triggered; and when the bit field for one-shot HARQ-ACK request is 0, one-shot HARQ-ACK feedback is not triggered. If one-shot HARQ-ACK codebook is triggered, UE transmit one-shot HARQ-ACK codebook.

Figure 5A:
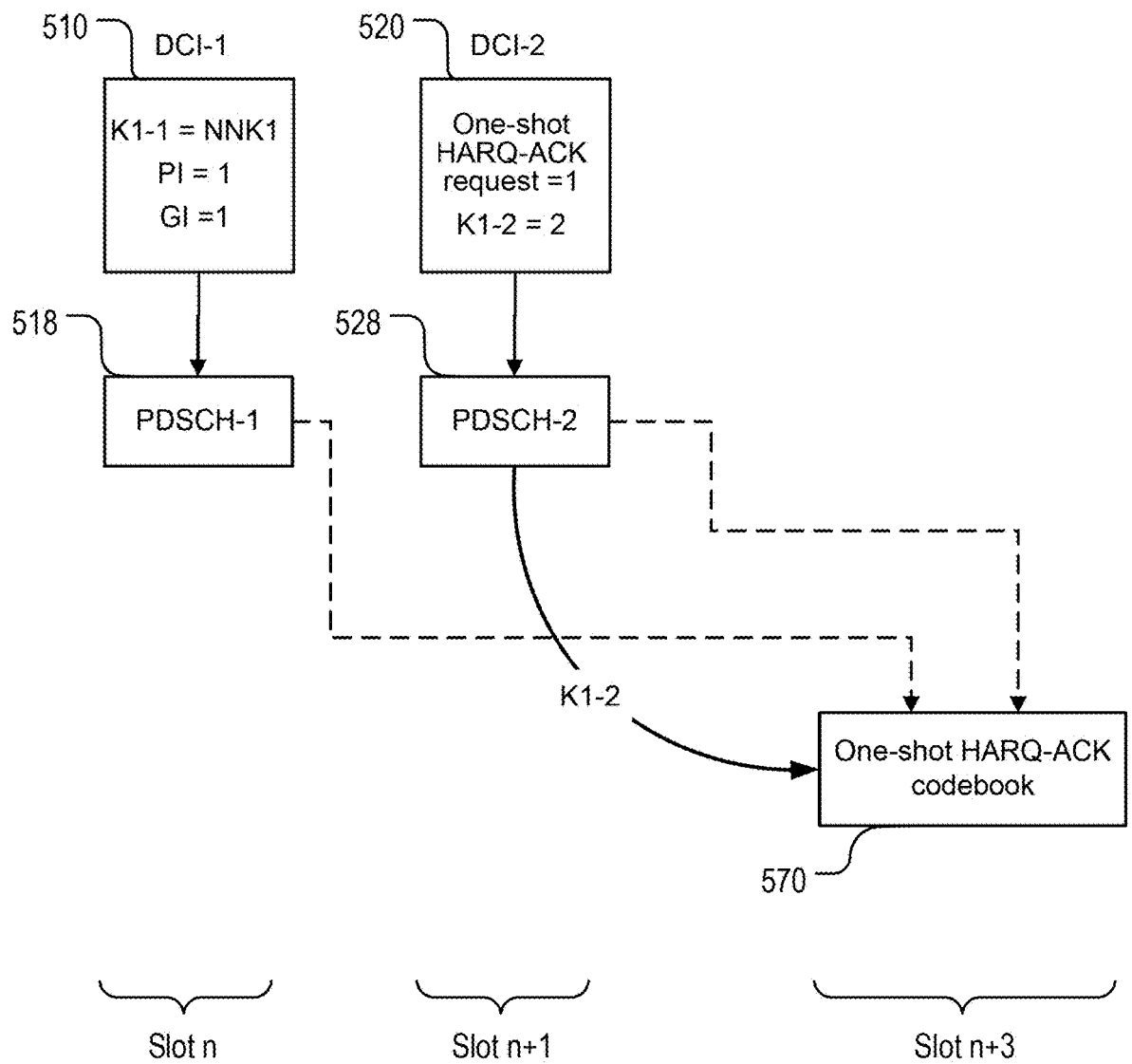
FIG. 5A shows a schematic diagram of a method for wireless communication.

Referring to FIG. 5A, for DCI format 1_2, a first DCI (DCI-1, 510) for a first PDSCH (PDSCH-1, 518) may have a PDSCH-to-HARQ_feedback timing indicator bit field (K1-1) of non-applicable value (or non-number value, or NNK1, or −1). Such a value of −1 may be configured to the UE by the RAN via a RRC parameter of dl-DataToUL-ACK. when the value of the PDSCH-to-HARQ_feedback timing indicator is −1, it tells UE that the UE should store the HARQ-ACK information of this PDSCH.

In one example, a UE receives the PDSCH-1 518 scheduled by the DCI-1 510 that the UE detects in a first PDCCH monitoring occasion and includes K1-1 of NNK1 from dl-DataToUL-ACK. The UE stores the HARQ-ACK information for the PDSCH-1. When the UE detects a second DCI (DCI-2, 520) for a second PDSCH (PDSCH-2, 528). The DCI-2 520 may include one bit of one-shot HARQ-ACK request field with value 1, and the PDSCH-to-HARQ feedback timing indicator field of an applicable value (e.g., K1-2=2). The UE may multiplex the corresponding HARQ-ACK information 518 for the PDSCH-1 in a PUCCH or PUSCH transmission in a slot that is indicated by a value of a PDSCH-to-HARQ feedback timing indicator field in the second DCI.

For one example referring to FIG. 5A, in slot n, the UE receives a PDSCH-1 518 corresponding to a DCI-1 510 including K1-1=NNK1, priority index (PI)=1, group index (GI)=1. In slot n+1, the UE receives a PDSCH-2 528 corresponding to a DCI-2 520 including the one-shot HARQ-ACK request field with value 1 and K1-2=2. The HARQ-ACK feedback for PDSCH-1 is combined with the HARQ-ACK feedback for PDSCH-2 and is transmitted on slot n+3 according to the K1-2 value in the DCI-2 and this ACK/NACK is included in the one-shot HARQ-ACK codebook 570. In another implementation, the DCI-1 510 may include PI=0 or GI=0. In another implementation, the PI of the first DCI may be different from the PI of the second DCI, and/or the GI of the first DCI may be different from the GI of the second DCI. In another implementation, the first DCI and/or the second DCI may not include a GI and/or PI value. In another implementation, when a DCI does not include GI, GI may have a default value of 0; and/or when a DCI does not include a PI, PI may have a default value of 0.

Figure 5B:
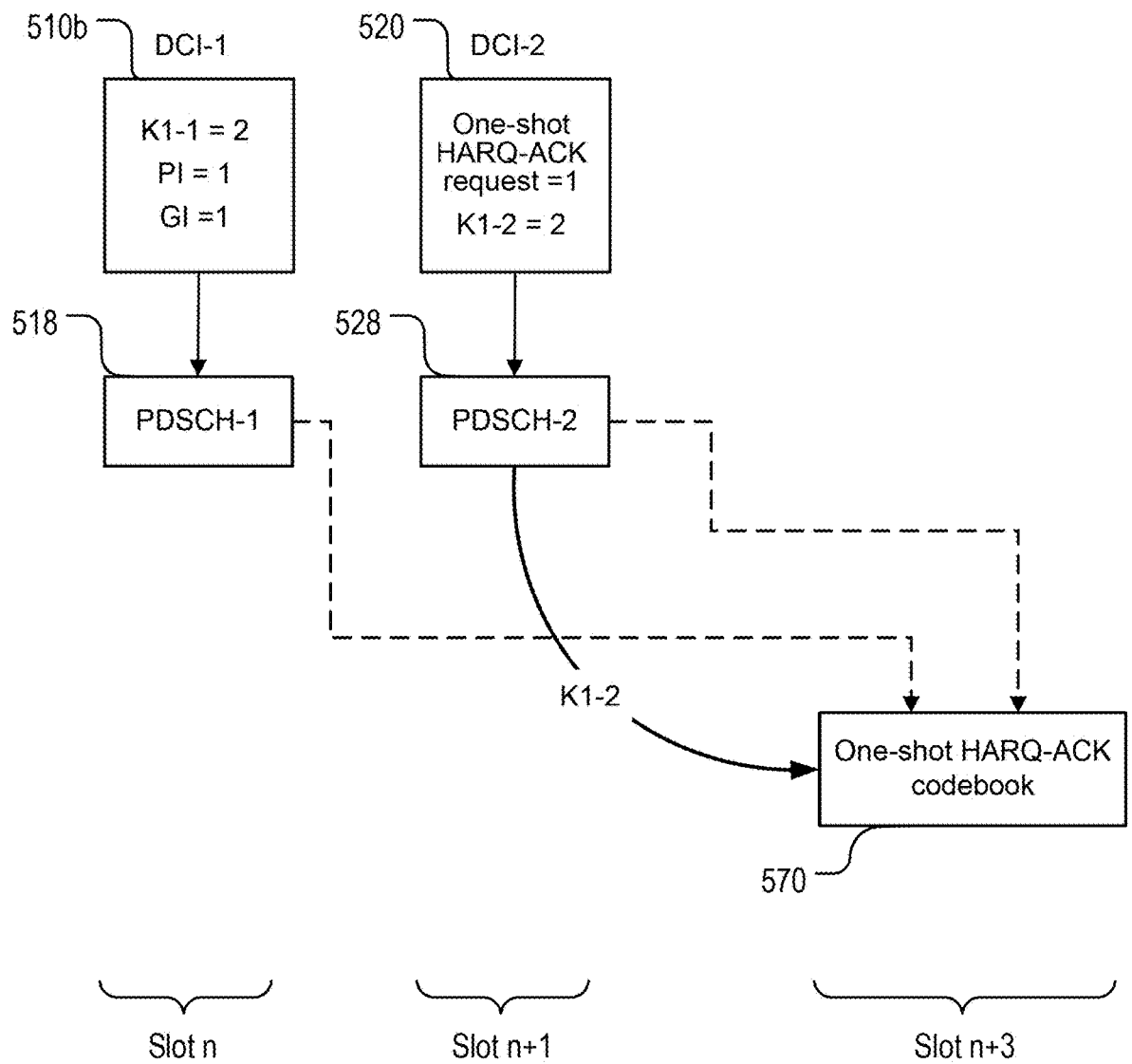
FIG. 5B shows a schematic diagram of a method for wireless communication.

In another implementation, the first K of the first DCI may also include an applicable value. For one example referring in FIG. 5B, a first DCI (DCI-1, 510b) may include a K of an applicable value (e.g., K1-1=2). Upon receiving a second DCI triggering one-shot HARQ-ACK feedback, the UE combines the HARQ-ACK feedback for PDSCH-1 in the one-shot HARQ-ACK codebook 570 with the HARQ-ACK feedback for PDSCH-2, and transmits the one-shot HARQ-ACK codebook 570 on slot n+3 according to the K1-2 value in the DCI-2.

In another embodiment, when the first DCI and the second DCI schedule PDSCH with a same priority index, the UE combines a first HARQ-ACK feedback for the first PDSCH in a one-shot HARQ-ACK codebook with a second HARQ-ACK feedback for the second PDSCH; and when the first DCI and the second DCI schedule PDSCH with different priority indexes, the UE postpones transmitting the first HARQ-ACK feedback for the first PDSCH until the UE receives another DCI comprising a K with an applicable value, an one-shot request field with a positive value, and scheduling PDSCH with a same priority index as the first DCI.

Figure 6:
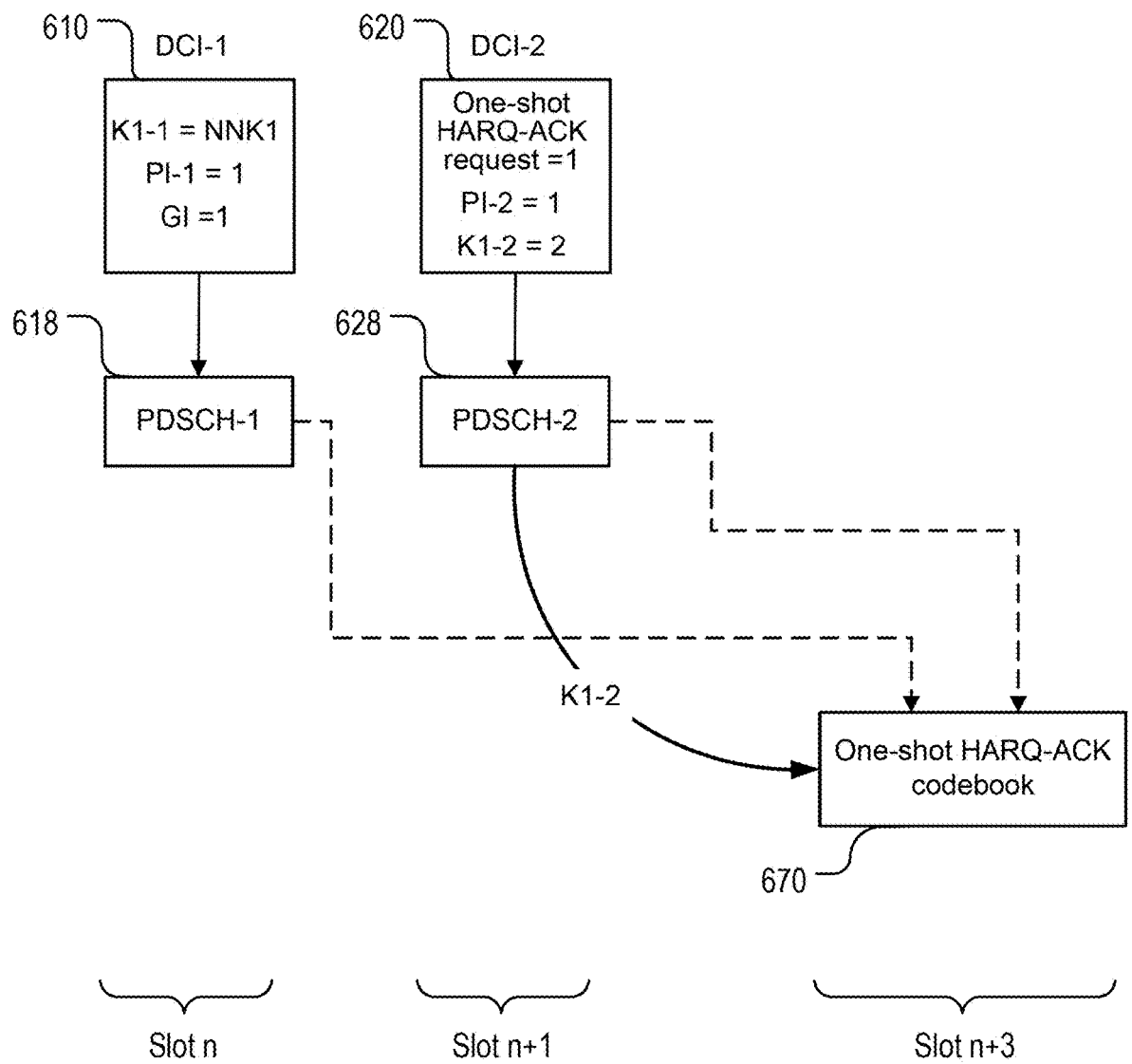
FIG. 6 shows a schematic diagram of a method for wireless communication.

For one example referring to FIG. 6, in slot n, the UE receives a PDSCH-1 618 corresponding to a DCI-1 610 including K1-1=NNK1, PI-1=1, GI=1. In slot n+1, the UE receives a PDSCH-2 628 corresponding to a DCI-2 620 including the one-shot HARQ-ACK request field with value 1, PI-2=1, and K1-2=2. Since the first DCI and the second DCI schedule PDSCH with a same priority index, the HARQ-ACK feedback for PDSCH-1 is combined with the HARQ-ACK feedback for PDSCH-2 and is transmitted on slot n+3 according to the K1-2 value in the DCI2 and this ACK/NACK is included in the one-shot HARQ-ACK codebook 670. In another implementation, the DCI-1 510 may include GI=0 which may be same or different from the GI of the DCI-2. In another implementation, the PI-1 may be 0 and the PI-2 may be 0. In another implementation, the GI of the first DCI may be same or different from the GI of the second DCI. In another implementation, the first DCI and/or the second DCI may not include a GI and/or PI value, which may have a default value of 0.

Figure 7:
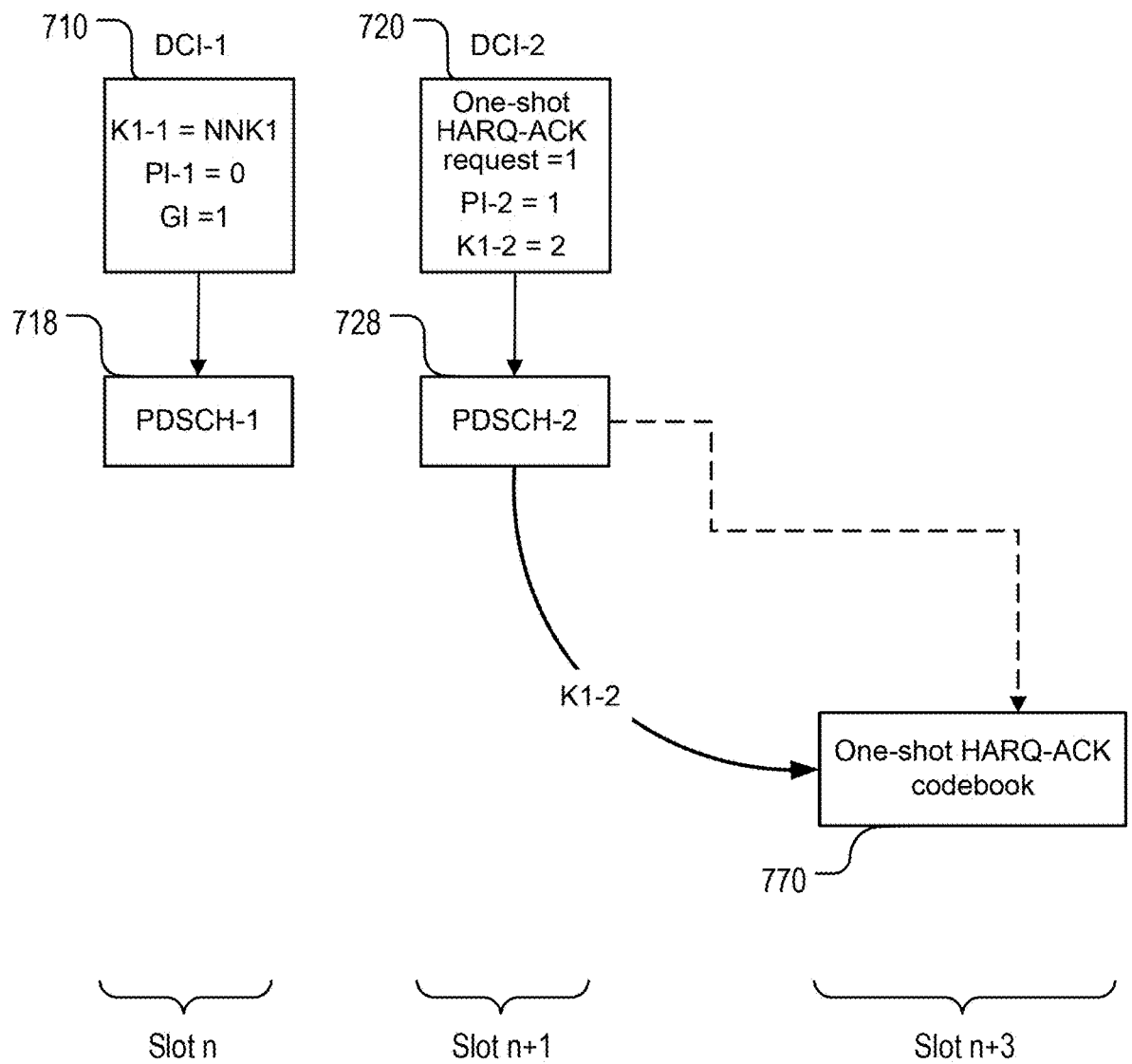
FIG. 7 shows a schematic diagram of a method for wireless communication.

For another example referring to FIG. 7, in slot n, the UE receives a PDSCH-1 718 corresponding to a DCI-1 710 including K1-1=NNK1, PI-1=0, GI=1. In slot n+1, the UE receives a PDSCH-2 728 corresponding to a DCI-2 720 including the one-shot HARQ-ACK request field with value 1, PI-2=1, and K1-2=2. Since the first DCI and the second DCI schedule PDSCH with different priority indexes, the HARQ-ACK feedback for PDSCH-1 is not combined with the HARQ-ACK feedback for PDSCH-2; and the HARQ-ACK feedback for PDSCH-1 is not transmitted on slot n+3 according to the K1-2 value in the DCI2. This ACK/NACK for PDSCH-1 is not included in the one-shot HARQ-ACK codebook 770. The UE may transmit the first HARQ-ACK feedback for the first PDSCH 718 at a later time when the UE receives another DCI comprising a K with an applicable value, an one-shot request field with a positive value, and scheduling PDSCH with a same priority index as the first DCI. In another implementation, the DCI-1 510 may include GI=0 which may be same or different from the GI of the DCI-2. In another implementation, the PI-1 may be 1 and the PI-2 may be 0. In another implementation, the first DCI and/or the second DCI may not include a GI and/or PI value, which may indicate a default value of 0.

In one implementation, the UE only report the ACK/NACK information for the HARQ process of PDSCH with the same Priority index that it last received of the DCI with the same HARQ process ID. Referring to FIG. 6, a UE may report the one-shot HARQ-ACK codebook including the ACK/NACK of all HARQ process transmit the PDSCH that has the same PI=1; and referring to FIG. 7, the HARQ-ACK for other HARQ process that transmit the PDSCH with the PI different of the PI indicated in the DCI may not be reported in the one-shot HARQ-ACK codebook.

In another implementation, referring to FIG. 6, when the value of the Priority indicator in the DCI scheduling PDSCH is the same as the Priority indicator of the DCI that trigger one-shot HARQ-ACK codebook, the HARQ-ACK of this HARQ process ID may be included in the one-shot HARQ-ACK codebook; and referring to FIG. 7, when the value of the Priority indicator in the DCI scheduling PDSCH is not the same as the Priority indicator of the DCI that trigger one-shot HARQ-ACK codebook, the HARQ-ACK of this HARQ process ID may not be included in the one-shot HARQ-ACK codebook.

In another embodiment, the UE may transmit different one-shot HARQ-ACK codebooks corresponding to different priority indexes. When the first DCI and the second DCI schedule PDSCH with a same priority index, the UE combines the first HARQ-ACK feedback for the first PDSCH in a first one-shot HARQ-ACK codebook with a second HARQ-ACK feedback for the second PDSCH, and the UE transmit the first one-shot HARQ-ACK codebook in a first sub-slot or slot. When the first DCI and the second DCI schedule PDSCH with different priority indexes, the UE combines the second HARQ-ACK feedback for the second PDSCH in a first one-shot HARQ-ACK codebook; the UE combines the first HARQ-ACK feedback for the first PDSCH in a second one-shot HARQ-ACK codebook, and the UE transmit the second one-shot HARQ-ACK codebook in a second sub-slot or slot.

A UE may be configured one-shot HARQ-ACK feedback enabled by pdsch-HARQ-ACK-OneShotFeedback-r16. The UE may receive a DCI including a one-shot HARQ-ACK request bit field value of 1. For example, the DCI may have a DCI format 1_1 or DCI format 1_2. The DCI may have a K of an applicable value (e.g., k1=2). After receiving this DCI, the UE may report the ACK/NACK for all the configured HARQ process of PDSCH configured to the UE of all the configured carrier.

In one implementation, the HARQ-ACK codebook for different priority index may be transmit on different PUCCH/PUSCH. In this case, the value of K, which is a PDSCH-to-HARQ feedback timing indicator, is for the HARQ-ACK codebook transmission for Priority index in the DCI, and the PDSCH-to-HARQ_feedback timing and the PUCCH resource for the other HARQ-ACK codebook of the other Priority index can be determined through one of the below method.

For one method, the slot/sub-slot that transmitting the second HARQ-ACK codebook for the other Priority index is the nearest available UL slot/sub-slot, such as the sub-slot next to the first HARQ-ACK codebook. a PUCCH resource indicator (PRI) of the PUCCH transmission carrying this HARQ-ACK codebook may be the same as indicated in the DCI triggered one-shot HARQ-ACK codebook.

Figure 8:
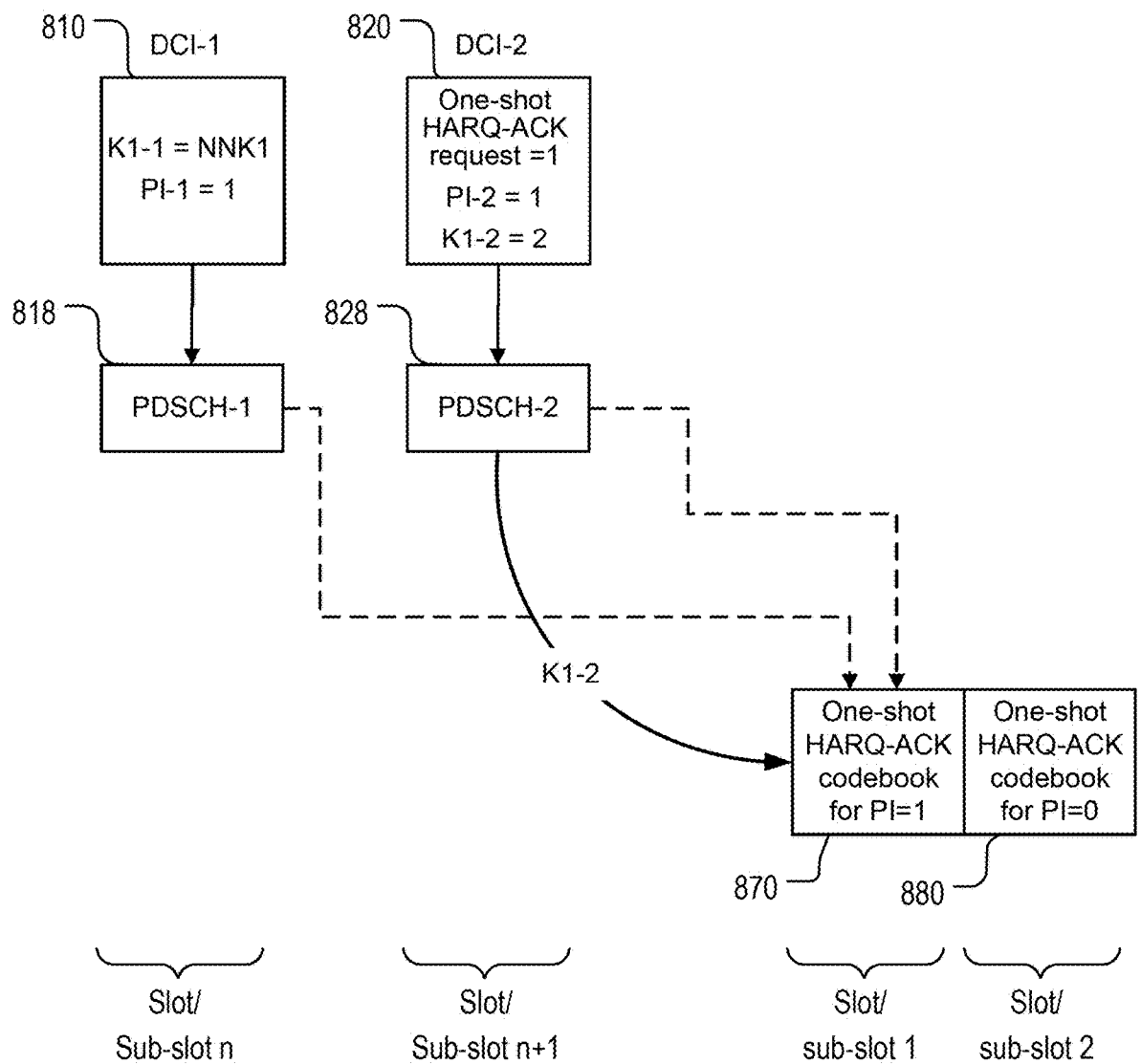
FIG. 8 shows a schematic diagram of a method for wireless communication.

For one example referring to FIG. 8, in slot/sub-slot n, the UE receives a PDSCH-1 818 corresponding to a DCI-1 810 including K1-1=NNK1, PI-1=1. In slot/sub-slot n+1, the UE receives a PDSCH-2 828 corresponding to a DCI-2 820 including the one-shot HARQ-ACK request field with value 1, PI-2=1, and K1-2=2. After received the second DCI that triggered one-shot request in sub-slot n+1, the UE combines the first HARQ-ACK feedback for the first PDSCH in a one-shot HARQ-ACK codebook for PI=1 with a second HARQ-ACK feedback for the second PDSCH and transmits the one-shot HARQ-ACK codebook 870 for PI=1 in sub-slot 1 on the PUCCH resource that indicated in the second DCI. The UE may also combine HARQ-ACK feedback for the other PDSCH with PI=0 (or no PI but default PI is 0) in a one-shot HARQ-ACK codebook for PI=0, and transmits the one-shot HARQ-ACK codebook for PI=0 in sub-slot 2.

Figure 9:
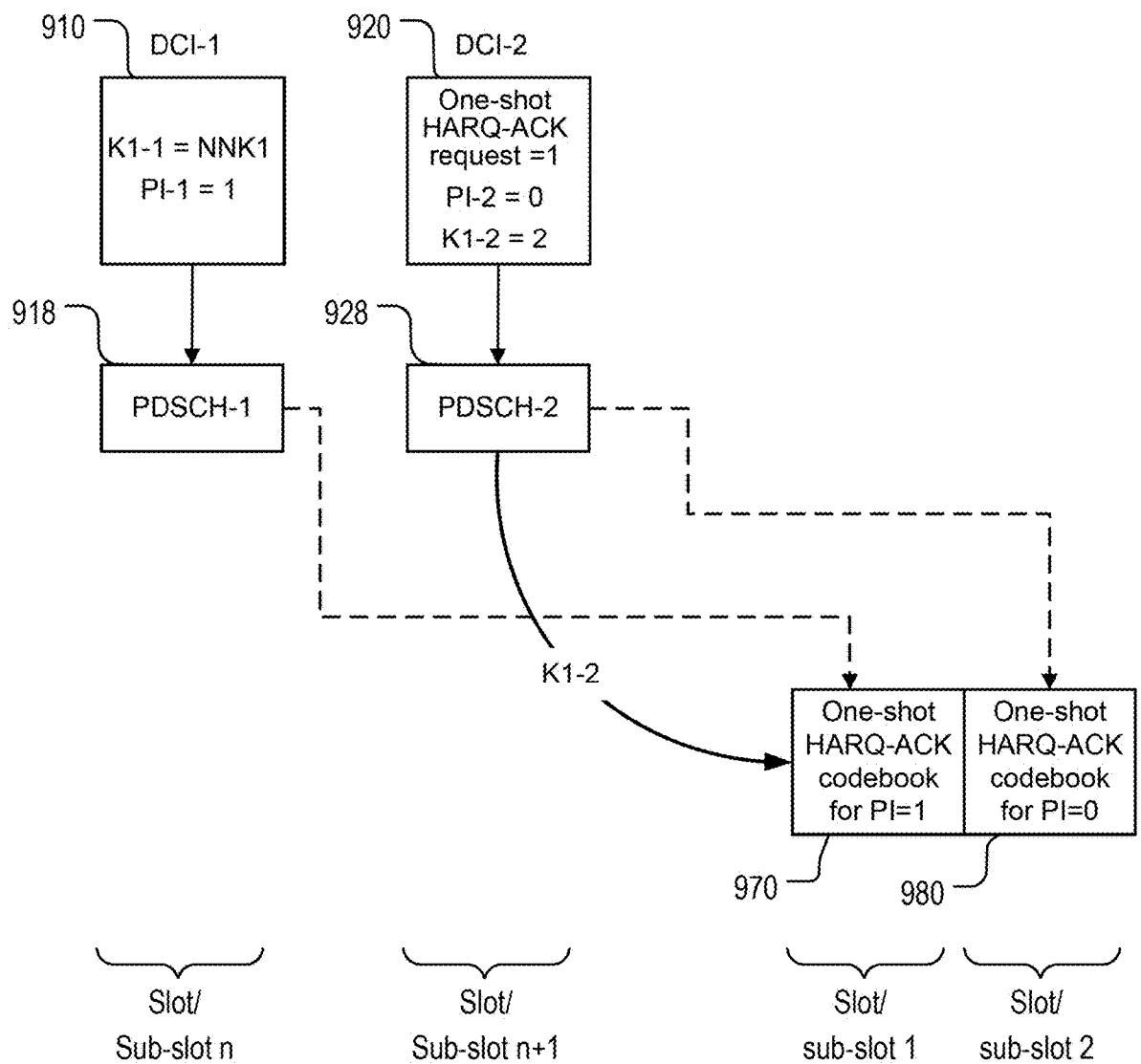
FIG. 9 shows a schematic diagram of a method for wireless communication.

For another example referring to FIG. 9, in slot/sub-slot n, the UE receives a PDSCH-1 918 corresponding to a DCI-1 910 including K1-1=NNK1, PI-1=1. In slot/sub-slot n+1, the UE receives a PDSCH-2 928 corresponding to a DCI-2 920 including the one-shot HARQ-ACK request field with value 1, PI-2=0, and K1-2=2. After received the second DCI that triggered one-shot request in sub-slot n+1, the UE combines the first HARQ-ACK feedback for the first PDSCH in a one-shot HARQ-ACK codebook for PI=1, and transmits the one-shot HARQ-ACK codebook 870 for PI=1 in sub-slot 1 on the PUCCH resource that indicated in the second DCI. The UE may also combine the second HARQ-ACK feedback for the second PDSCH in a one-shot HARQ-ACK codebook for PI=0, and transmits the one-shot HARQ-ACK codebook for PI=0 in sub-slot 2. In another implementation, the DCI-2 may not include PI-2 value and a default PI value is 0.

The embodiment may include methods for determining the slot/sub-slot used for transmitting the one-shot HARQ-ACK codebook for PI=0. In one implementation, when a sub-slot next to sub-slot 1 is available, the sub-slot 2 may be the sub-slot next to sub-slot 1, i.e., the sub-slot 1 and the sub-slot 2 are next to each other. In another implementation, when the sub-slot next to sub-slot 1 is not available, such as the SFI indicate this sub-slot is used for DL transmission, the UE may send the one-shot HARQ-ACK codebook for PI=0 in the next available sub-slot.

For another method, a DCI may include a second K value and/or PRI to determine the slot/sub-slot that transmitting the second one-shot HARQ-ACK codebook for the other priority index.

Figure 10A:
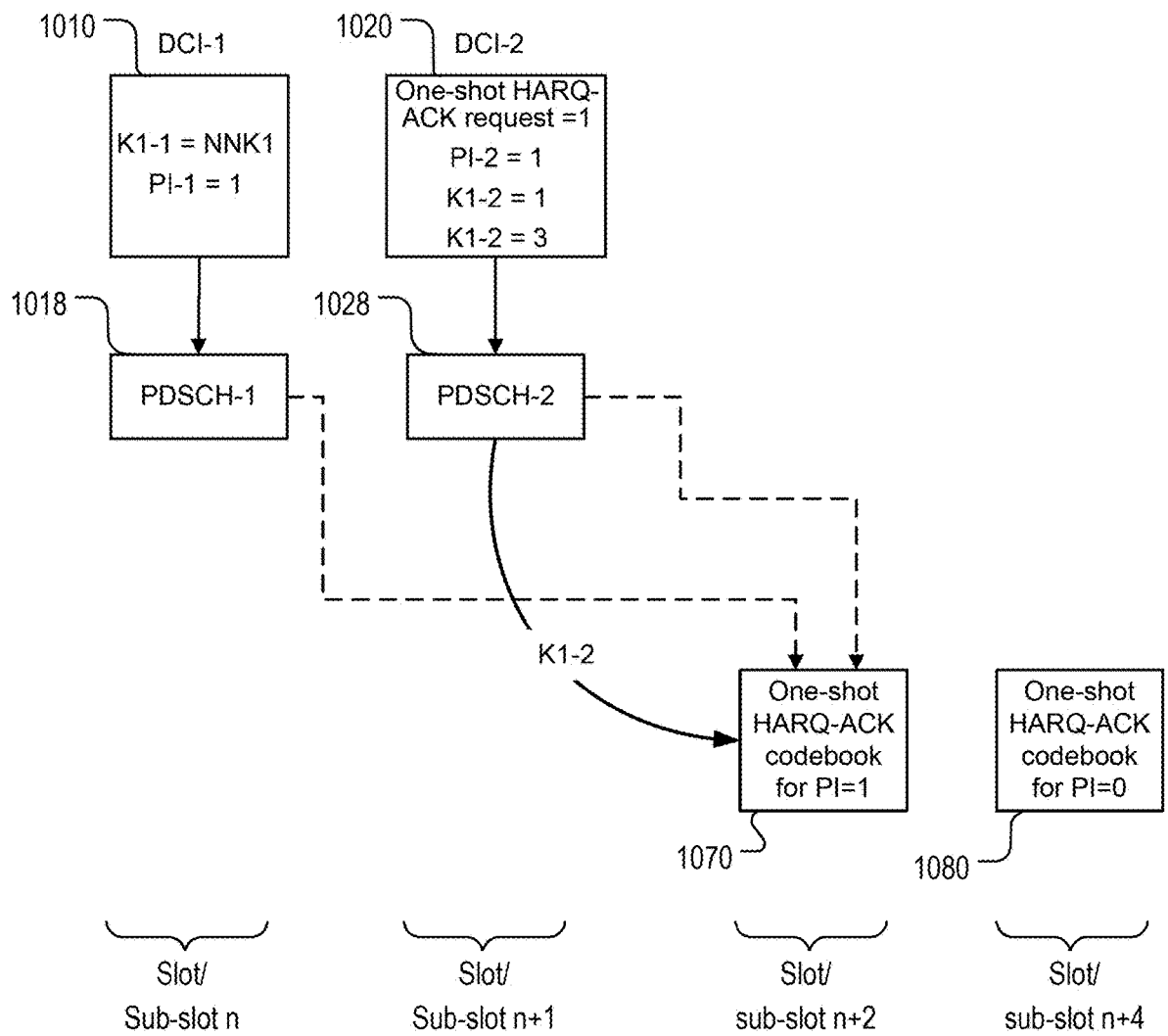
FIG. 10A shows a schematic diagram of a method for wireless communication.

In one implementation, the second K in the DCI may determine the slot/sub-lot for the second one-shot HARQ-ACK codebook relative to the PDSCH corresponding to the DCI. For one example referring to FIG. 10A, in slot/sub-slot n, the UE receives a PDSCH-1 1018 corresponding to a DCI-1 1010 including K1-1=NNK1, PI-1=1. In slot/sub-slot n+1, the UE receives a PDSCH-2 1028 corresponding to a DCI-2 1020 including the one-shot HARQ-ACK request field with value 1, PI-2=1, and two K values as K1-2=1 and K1-2=3. After received the second DCI that triggered one-shot request in sub-slot n+1, the UE combines the first HARQ-ACK feedback for the first PDSCH in a one-shot HARQ-ACK codebook for PI=1 with a second HARQ-ACK feedback for the second PDSCH and transmits the one-shot HARQ-ACK codebook 1070 for PI=1 in sub-slot n+2 on the PUCCH resource that indicated in the second DCI. The UE may also combine HARQ-ACK feedback for the other PDSCH with PI=0 (or no PI but default PI is 0) in a one-shot HARQ-ACK codebook for PI=0, and transmits the one-shot HARQ-ACK codebook for PI=0 in sub-slot n+4.

Figure 10B:
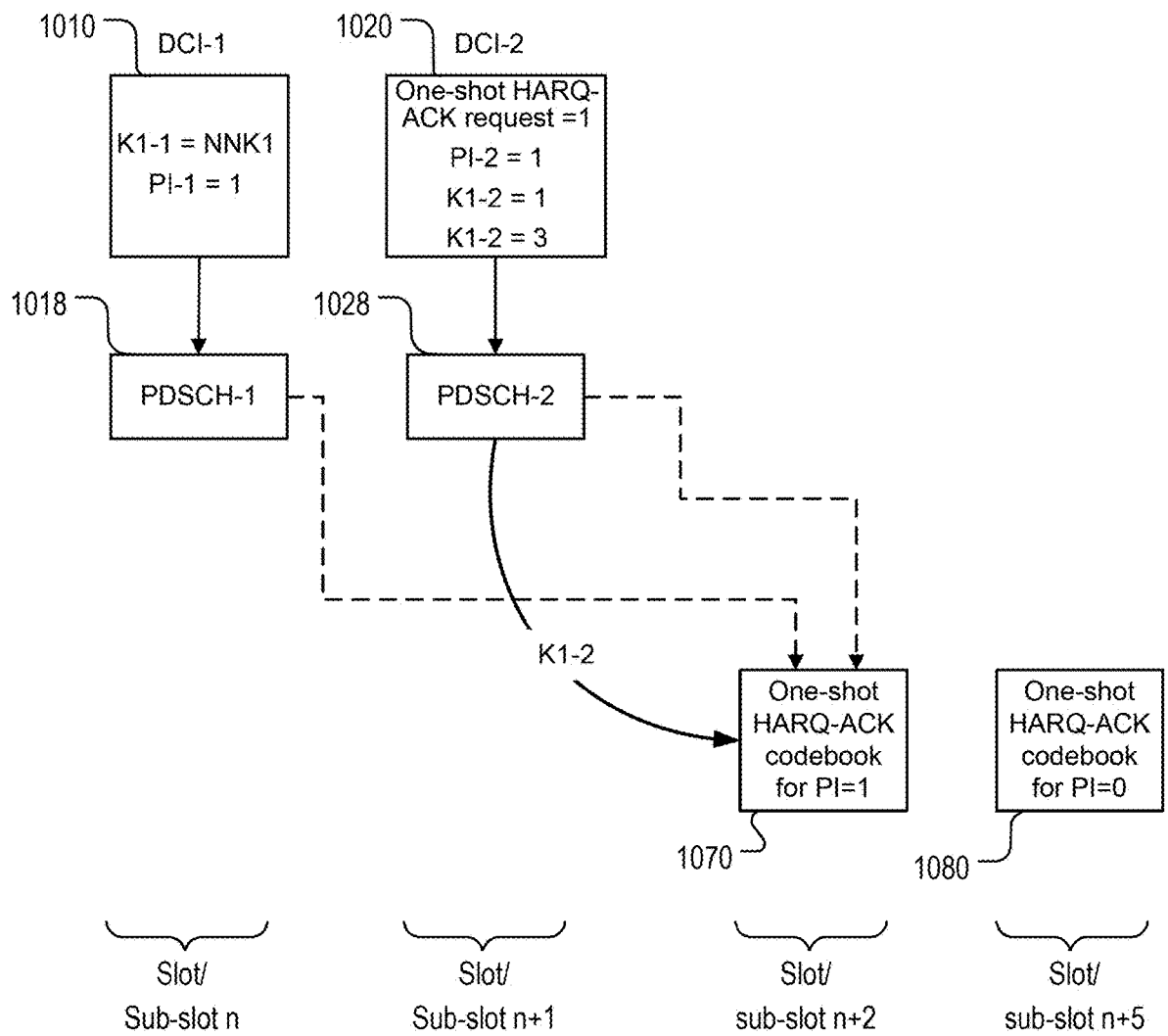
FIG. 10B shows a schematic diagram of a method for wireless communication.

In another implementation, the second K in the DCI may determine the slot/sub-lot for the second one-shot HARQ-ACK codebook relative to the slot/sub-lot for the first one-shot HARQ-ACK codebook. For example, referring to FIG. 10B, because the second K1-2=3 in the DCI-2 1020, the UE may transmit the one-shot HARQ-ACK codebook for PI=0 (1080) in sub-slot n+5, which is 3 sub-slot from the sub-slot for transmitting the one-shot HARQ-ACK codebook for PI=1 (1070).

In another implementation, the DCI may include two K1 value and two PRI value separately for different HARQ-ACK codebook of different priority indexes. For example, the DCI-2 in FIGS. 10A and/or 10B may include the one-shot HARQ-ACK request field with value 1, PI-2=1, and two sets of {K1-2=1 and PRI=1}; and {K1-2=3 and PRI=3}. The UE may transmit the first one-shot HARQ-ACK codebook in a slot at the K1-2=1 after the second PDSCH and corresponds to the first PRI=1; and the UE may transmit the second one-shot HARQ-ACK codebook in a slot at the K1-2=3 after the second PDSCH and corresponds to the second PRI=3.

The embodiment may include methods for determining whether the one-shot HARQ-ACK codebook for PI=1 is transmitted prior to the one-shot HARQ-ACK codebook for PI=0. In one implementation, by default, the one-shot HARQ-ACK codebook for PI=1 is transmitted prior to the one-shot HARQ-ACK codebook for PI=0. This may be due to transmission corresponding to PI=1 has a higher priority than transmission corresponding to PI=0, so that the one-shot HARQ-ACK codebook for PI=1 has higher priority than the one-shot HARQ-ACK codebook for PI=0. In another implementation, the determination may depend on the PI value of the DCI including the one-shot HARQ-ACK request field with value 1, for example, the DCI-2 in FIG. 8. When the PI-2 of the DCI-2 is 1, the one-shot HARQ-ACK codebook for PI=1 is transmitted prior to the one-shot HARQ-ACK codebook for PI=0; and when the PI-2 of the DCI-2 is 0, the one-shot HARQ-ACK codebook for PI=0 is transmitted prior to the one-shot HARQ-ACK codebook for PI=1.

In another embodiment, the UE may transmit one single one-shot HARQ-ACK codebook including two sub-codebooks corresponding to different priority indexes. The UE may report the ACK/NACK for all the HARQ process of PDSCH configured to the UE of all the configured carrier in the same HARQ-ACK codebook, and the HARQ-ACK codebook for different priority indicator in the PUCCH group may be transmitted on the same PUCCH/PUSCH. The one-shot HARQ-ACK codebook may include two sub-codebooks, which are separately constructed for different Priority. The embodiment includes various implementations to determine the order of the HARQ-ACK bit in this HARQ-ACK codebook.

In one implementation, a first sub-codebook is determined according to the scheduled Priority indicated in the DCI triggered the one-shot HARQ-ACK feedback, and a second sub-codebook may include the HARQ-ACK of the other Priority.

In another implementation, a first sub-codebook is determined according to the scheduled priority index of 1, and a second sub-codebook may be corresponding to the scheduled priority index of 0.

In another implementation, a first sub-codebook is determined according to the scheduled priority index of 0, and a second sub-codebook may be corresponding to the scheduled priority index of 1.

Figure 11:
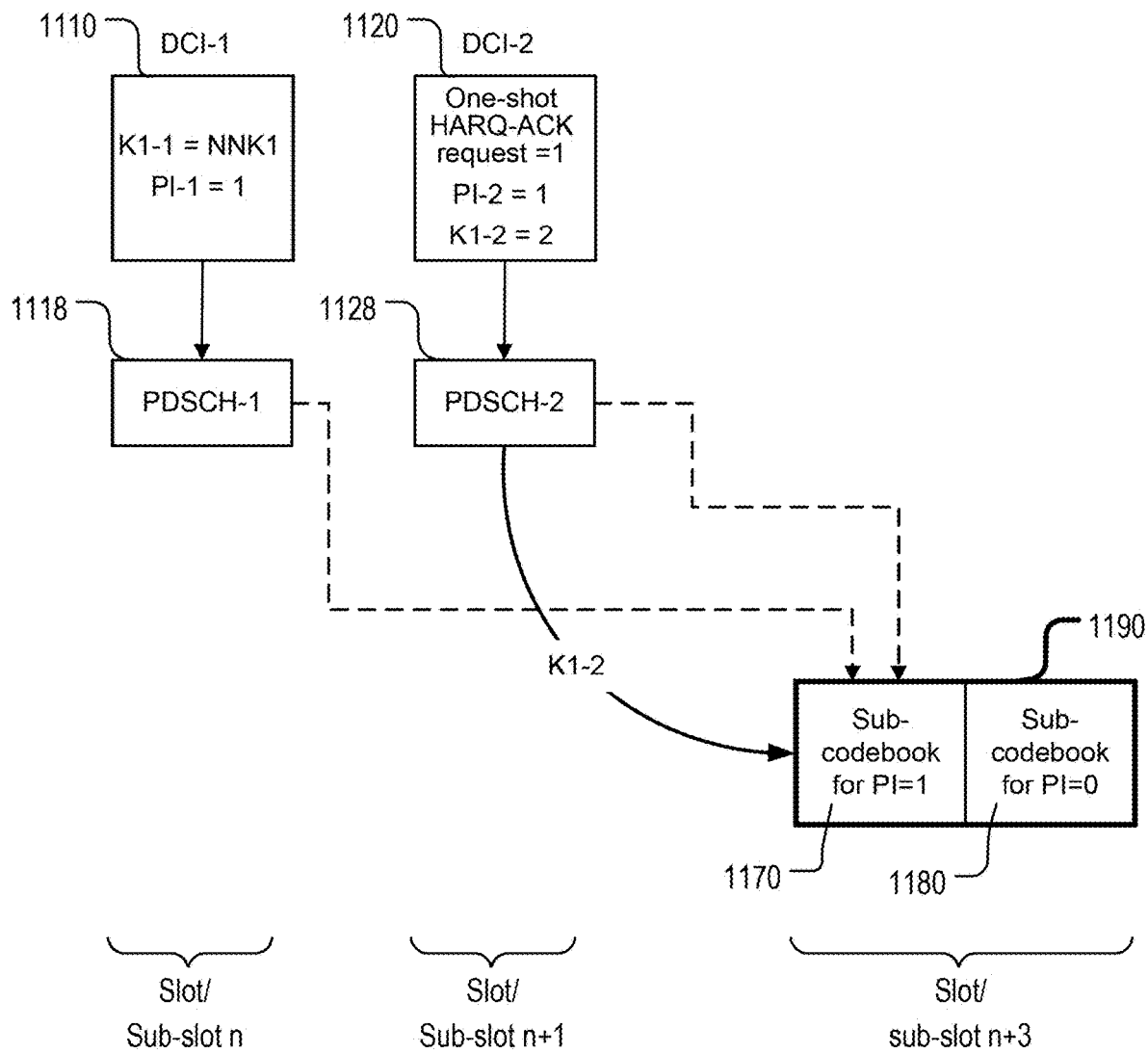
FIG. 11 shows a schematic diagram of a method for wireless communication.

For one example referring to FIG. 11, in slot/sub-slot n, the UE receives a PDSCH-1 1118 corresponding to a DCI-1 1110 including K1-1=NNK1, PI-1=1. In slot/sub-slot n+1, the UE receives a PDSCH-2 1128 corresponding to a DCI-2 1120 including the one-shot HARQ-ACK request field with value 1, PI-2=1, and K1-2=2. After received the second DCI that triggered one-shot request in sub-slot n+1, the UE combines the first HARQ-ACK feedback for the first PDSCH in a one-shot HARQ-ACK sub-codebook 1170 for PI=1 with a second HARQ-ACK feedback for the second PDSCH. The UE may also combine HARQ-ACK feedback for the other PDSCH with PI=0 (or no PI but default PI is 0) in a one-shot HARQ-ACK sub-codebook for PI=0. The UE may transmits a one-shot HARQ-ACK codebook 1190 in sub-slot n+3 on the PUCCH resource as indicated in the second DCI. The one-shot HARQ-ACK codebook 1190 includes the sub-codebook for PI=1 (1170) and the sub-codebook for PI=0 (1180).

Figure 12:
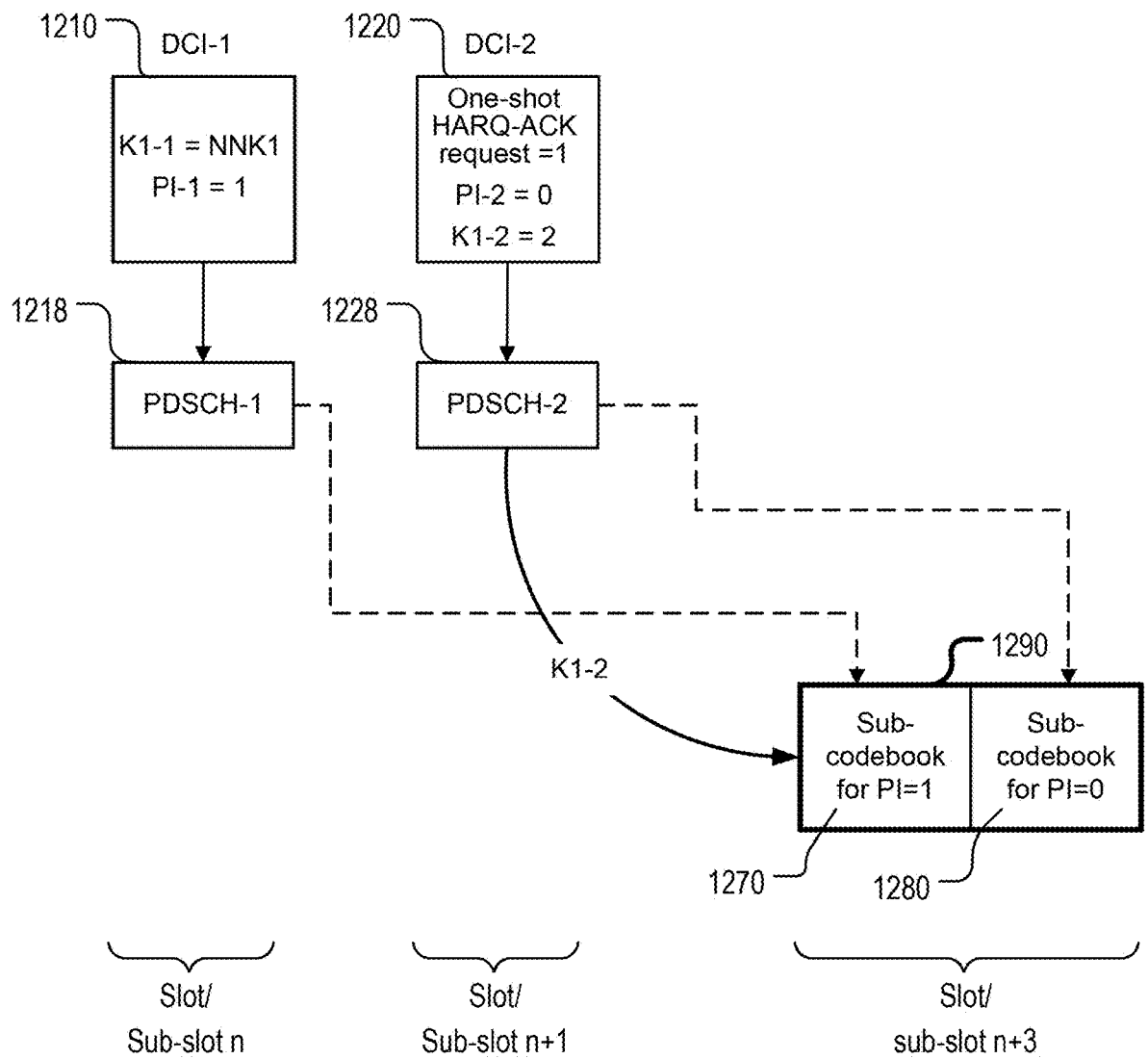
FIG. 12 shows a schematic diagram of a method for wireless communication.

For another example referring to FIG. 12, in slot/sub-slot n, the UE receives a PDSCH-1 1218 corresponding to a DCI-1 1210 including K1-1=NNK1, PI-1=1. In slot/sub-slot n+1, the UE receives a PDSCH-2 1228 corresponding to a DCI-2 1220 including the one-shot HARQ-ACK request field with value 1, PI-2=0, and K1-2=2. After received the second DCI that triggered one-shot request in sub-slot n+1, the UE combines the first HARQ-ACK feedback for the first PDSCH in a one-shot HARQ-ACK sub-codebook 1270 for PI=1. The UE may combine a second HARQ-ACK feedback for the second PDSCH in a one-shot HARQ-ACK sub-codebook for PI=0. The UE may transmits a one-shot HARQ-ACK codebook 1290 in sub-slot n+3 on the PUCCH resource as indicated in the second DCI. The one-shot HARQ-ACK codebook 1290 includes the sub-codebook for PI=1 (1270) and the sub-codebook for PI=0 (1280).

In another implementation, each sub-codebook may be constructed respectively according to the RRC parameters separately configured. For example, harq-Codebook 1 for PI=0 may be configured with pdsch-HARQ-ACK-OneShotFeedbackCBG-r16 and pdsch-HARQ-ACK-OneShotFeedbackNDI-r16 enabled, and/or harq-Codebook 2 for PI=1 may be configured with pdsch-HARQ-ACK-OneShotFeedbackCBG-r16 and pdsch-HARQ-ACK-OneShotFeedbackNDI-r16 disabled. In one implementation, when the HARQ process number is the same, the sub-codebook for PI=0 may have a larger size than the sub-codebook for PI=1.

In another implementation, the sequence of the HARQ-ACK bit of the PDSCH in the one-shot HARQ-ACK codebook may be determined based on the carrier index. For each carrier, the order of the HARQ-ACK bit may be according to a HARQ process ID configured to the UE of this carrier.

The present disclosure describes methods, apparatus, and computer-readable medium for wireless communication. The present disclosure addressed the issues with configuring hybrid automatic repeat request acknowledgement (HARQ-ACK) feedback for physical downlink shared channel (PDSCH) transmission. The methods, devices, and computer-readable medium described in the present disclosure may facilitate the performance of wireless communication by configuring HARQ-ACK feedback for PDSCH transmission, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
   configuring hybrid automatic repeat request acknowledgement (HARQ-ACK) feedback for physical downlink shared channel (PDSCH) transmission by:
   receiving, by a user equipment (UE), a radio resource control (RRC) parameter to configure a one-shot HARQ-ACK feedback mode;
   receiving, by the UE, a first downlink control information (DCI) comprising a first K, the first DCI corresponding to a first PDSCH;
   receiving, by the UE, a second DCI comprising a second K with an applicable value and an one-shot request field with a positive value, the second DCI corresponding to a second PDSCH; and
   transmitting, by the UE, a one-shot HARQ-ACK feedback according to a preset rule, wherein:
   in response to the first DCI and the second DCI scheduling PDSCH with a same priority index, the UE combines a first HARQ-ACK feedback for the first PDSCH in a first one-shot HARQ-ACK codebook with a second HARQ-ACK feedback for the second PDSCH, or
   in response to the first DCI and the second DCI scheduling PDSCH with different priority indexes, the UE postpones transmitting the first HARQ-ACK feedback for the first PDSCH until the UE receives another DCI comprising a K with an applicable value, an one-shot request field with a positive value, and scheduling PDSCH with a same priority index as the first DCI.

2. The method according to claim 1, wherein:
   the UE transmits the first one-shot HARQ-ACK codebook in a slot at the second K after the second PDSCH.

3. The method according to claim 1, wherein:
   in response to the first DCI and the second DCI scheduling PDSCH with a same priority index:
   the UE transmit the first one-shot HARQ-ACK codebook in a first sub-slot or slot; and
   in response to the first DCI and the second DCI scheduling PDSCH with different priority indexes:
   the UE combines the second HARQ-ACK feedback for the second PDSCH in a the first one-shot HARQ-ACK codebook,
   the UE combines the first HARQ-ACK feedback for the first PDSCH in a second one-shot HARQ-ACK codebook, and
   the UE transmits the second one-shot HARQ-ACK codebook in a second sub-slot or slot.

4. The method according to claim 3, wherein:
the first sub-slot and the second sub-slot are next to each other.

5. The method according to claim 4, wherein:
the first sub-slot and the second sub-slot are in a slot at the second K after the second PDSCH.

6. The method according to claim 4, wherein:
the first sub-slot is prior to the second sub-slot.

7. The method according to claim 4, wherein:
in response to the second DCI comprising the priority index of 1, the first sub-slot is prior to the second sub-slot; and
in response to the first DCI comprising the priority index of 0, the second sub-slot is prior to the first sub-slot.

8. The method according to claim 3, wherein:
the second DCI comprises a third K of an applicable value;
the first sub-slot is in a slot at the second K after the second PDSCH; and
the second sub-slot is in a slot at the third K after the second PDSCH.

9. The method according to claim 8, wherein:
the third K comprises at least one of: an offset of the second K, or an offset of the first sub-slot.

10. The method according to claim 3, wherein:
the second DCI comprises the second K and a first PRI corresponding to a second K, and a third K of an applicable value and a second PRI corresponding to the third K;
the first sub-slot is in a slot at the second K after the second PDSCH and corresponds to the first PRI; and
the second sub-slot is in a slot at the third K after the second PDSCH and corresponds to the second PRI.

11. The method according to claim 10, wherein:
the first sub-slot is prior to the second sub-slot.

12. The method according to claim 1, wherein:
in response to the first DCI and the second DCI scheduling PDSCH with a same priority index:
the UE combines a first HARQ-ACK feedback for the first PDSCH in a first sub-codebook with a second HARQ-ACK feedback for the second PDSCH in a the first one-shot HARQ-ACK codebook; and
in response to the first DCI and the second DCI scheduling PDSCH with different priority indexes:
the UE combines the first HARQ-ACK feedback in the first sub-codebook in the first one-shot HARQ-ACK codebook, and
the UE combines the second HARQ-ACK feedback in the first sub-codebook in the first one-shot HARQ-ACK codebook.

13. An apparatus comprising:
a memory storing instructions; and
a processor in communication with the memory, wherein, when the processor executes the instructions, the processor is configured to cause the apparatus to perform configuring hybrid automatic repeat request acknowledgement (HARQ-ACK) feedback for physical downlink shared channel (PDSCH) transmission by:
receiving a radio resource control (RRC) parameter to configure a one-shot HARQ-ACK feedback mode;
receiving a first downlink control information (DCI) comprising a first K, the first DCI corresponding to a first PDSCH;
receiving a second DCI comprising a second K with an applicable value and an one-shot request field with a positive value, the second DCI corresponding to a second PDSCH; and
transmitting a one-shot HARQ-ACK feedback according to a preset rule, wherein:
in response to the first DCI and the second DCI scheduling PDSCH with a same priority index, the apparatus is configured to combine a first HARQ-ACK feedback for the first PDSCH in a first one-shot HARQ-ACK codebook with a second HARQ-ACK feedback for the second PDSCH, or
in response to the first DCI and the second DCI scheduling PDSCH with different priority indexes, the apparatus postpones transmitting the first HARQ-ACK feedback for the first PDSCH until the apparatus receives another DCI comprising a K with an applicable value, an one-shot request field with a positive value, and scheduling PDSCH with a same priority index as the first DCI.

14. The apparatus according to claim 13, wherein:
in response to the first DCI and the second DCI scheduling PDSCH with a same priority index:
the apparatus transmit the first one-shot HARQ-ACK codebook in a first sub-slot or slot; and
in response to the first DCI and the second DCI scheduling PDSCH with different priority indexes:
the apparatus combines the second HARQ-ACK feedback for the second PDSCH in a first one-shot HARQ-ACK codebook,
the apparatus combines the first HARQ-ACK feedback for the first PDSCH in a second one-shot HARQ-ACK codebook, and
the apparatus transmit the second one-shot HARQ-ACK codebook in a second sub-slot or slot.

15. The apparatus according to claim 13, wherein:
in response to the first DCI and the second DCI scheduling PDSCH with a same priority index:
the apparatus combines a first HARQ-ACK feedback for the first PDSCH in a first sub-codebook with a second HARQ-ACK feedback for the second PDSCH in the first one-shot HARQ-ACK codebook; and
in response to the first DCI and the second DCI scheduling PDSCH with different priority indexes:
the apparatus combines the first HARQ-ACK feedback in the first sub-codebook in the first one-shot HARQ-ACK codebook, and
the apparatus combines the second HARQ-ACK feedback in the first sub-codebook in the first one-shot HARQ-ACK codebook.

16. A computer program product comprising a computer-readable program medium storing instructions, wherein, the instructions, when executed by a processor, are configured to cause the processor to perform:
configuring hybrid automatic repeat request acknowledgement (HARQ-ACK) feedback for physical downlink shared channel (PDSCH) transmission by:
receiving a radio resource control (RRC) parameter to configure a one-shot HARQ-ACK feedback mode;
receiving a first downlink control information (DCI) comprising a first K, the first DCI corresponding to a first PDSCH;
receiving a second DCI comprising a second K with an applicable value and an one-shot request field with a positive value, the second DCI corresponding to a second PDSCH; and
transmitting a one-shot HARQ-ACK feedback according to a preset rule, wherein:

in response to the first DCI and the second DCI scheduling PDSCH with a same priority index, the processor is configured to combine a first HARQ-ACK feedback for the first PDSCH in a first one-shot HARQ-ACK codebook with a second HARQ-ACK feedback for the second PDSCH, or in response to the first DCI and the second DCI scheduling PDSCH with different priority indexes, the processor postpones transmitting the first HARQ-ACK feedback for the first PDSCH until the processor receives another DCI comprising a K with an applicable value, an one-shot request field with a positive value, and scheduling PDSCH with a same priority index as the first DCI.

* * * * *